(12) United States Patent
Belwafa et al.

(10) Patent No.: US 9,976,936 B2
(45) Date of Patent: May 22, 2018

(54) TESTING FIXTURE FOR VEHICLE IMPACT SIMULATION

(71) Applicant: Ford Global Technologies, LLC, Dearborn, MI (US)

(72) Inventors: Jamel E. Belwafa, Ann Arbor, MI (US); William Gary Ballard, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days. days.

(21) Appl. No.: 15/669,521

(22) Filed: Aug. 4, 2017

(65) Prior Publication Data

US 2017/0336290 A1    Nov. 23, 2017

Related U.S. Application Data

(63) Continuation-in-part of application No. 14/613,868, filed on Feb. 4, 2015.

(51) Int. Cl.
   *G01M 17/007* (2006.01)
   *G09B 9/042* (2006.01)

(52) U.S. Cl.
   CPC ...... *G01M 17/0078* (2013.01); *G01M 17/007* (2013.01); *G09B 9/042* (2013.01)

(58) Field of Classification Search
   CPC ............. G01M 17/0078; G01M 17/00; G01M 17/0074; F15B 15/261

USPC ........ 73/116.01, 122; 280/801.1, 801.2, 808, 280/803, 807; 297/468–473, 480, 483

See application file for complete search history.

(56) References Cited

U.S. PATENT DOCUMENTS

| | | | |
|---|---|---|---|
| 2,917,277 A | 12/1959 | Pine | |
| 3,224,258 A | 12/1965 | Preston | |
| 4,630,472 A | 12/1986 | Zimmerman et al. | |
| 5,265,908 A | 11/1993 | Verellen et al. | |
| 5,931,502 A | 8/1999 | Frank et al. | |
| 6,935,701 B1 | 8/2005 | Arnold et al. | |
| 7,380,436 B2 | 6/2008 | McCoy | |
| 2004/0211313 A1 | 10/2004 | Yamaguchi | |
| 2005/0023815 A1 | 2/2005 | Hoffmann et al. | |
| 2005/0173916 A1 | 8/2005 | Sugimoto | |
| 2006/0091666 A1 | 5/2006 | Arnold et al. | |
| 2007/0138782 A1 | 6/2007 | Murthy et al. | |
| 2015/0330870 A1 | 11/2015 | Hemerson | |

FOREIGN PATENT DOCUMENTS

| | | |
|---|---|---|
| CN | 201707041 U | 1/2011 |
| CN | 102628753 A | 8/2012 |
| CN | 203587074 U | 5/2014 |

*Primary Examiner* — Peter Macchiarolo
*Assistant Examiner* — Anthony W Megna Fuentes
(74) *Attorney, Agent, or Firm* — Frank A. MacKenzie; Bejin Bieneman PLC

(57) ABSTRACT

A fixture includes a vehicle body and a tube connected to the vehicle body. The tube has an axis, and the fixture includes a piston slideably disposed in the tube along the axis. A seat belt D-ring is mounted to the piston. The tube and the piston each define holes positioned to be aligned with each other when the piston is in multiple positions along the axis in the tube. A pin is engageable with the holes when the holes are aligned.

10 Claims, 14 Drawing Sheets

TESTING FIXTURE FOR VEHICLE IMPACT SIMULATION

CROSS-REFERENCE TO RELATED APPLICATIONS

This patent application is a continuation-in-part of and claims priority to and all advantages of U.S. patent application Ser. No. 14/613,868 filed on Feb. 4, 2015, which is herein incorporated by reference in its entirety.

BACKGROUND

A vehicle impact may be simulated for the purpose of testing components of the vehicle such as seat mounts, seat components, seat belts, airbags, etc. For example, a vehicle rollover, a vehicle frontal impact, a vehicle side impact, etc., may be simulated. In the example of a vehicle rollover simulation, the vehicle, or a portion of the vehicle, such as the body-in-white, may be placed in a cage and the cage may be rolled to simulate a rollover. Specifically, the cage may be placed on a movable platform, which is moved along a track. Brakes are applied to abruptly stop the platform, at which time the cage rolls off of the platform and continues to roll to simulate a vehicle rollover. Such tests may be referred to as rollover component tests.

The cage allows for simulation of the vehicle rollover while preventing damage to the exterior of the vehicle during the simulation. Since the exterior of the vehicle is not damaged during the simulation of the vehicle rollover, the exterior of the vehicle, e.g., the body-in-white, may be re-used in repeated vehicle rollover simulations.

However, during an accidental vehicle rollover, portions of the exterior of the vehicle may deform. Since the cage protects the exterior of the vehicle during the vehicle rollover simulation, the rollover simulation in the cage does not simulate this exterior deformation. For example, the B-pillar of the vehicle, which supports a D-ring of a front seat belt, may deform during an accidental rollover. This deformation of the B-pillar during the rollover moves the D-ring of the front seat belt. As such, this aspect of the operation of the front seat belt is not portrayed during the rollover simulation in the cage.

In the example of a vehicle frontal impact, the vehicle, or a portion of the vehicle, such as the body-in-white, may be placed in a cage on a sled buck. The sled buck may be accelerated and decelerated to simulate a vehicle frontal impact. The use of the cage and the sled buck allows the vehicle frontal impact to be simulated without damaging a vehicle.

DETAILED DESCRIPTION

Figure 8:
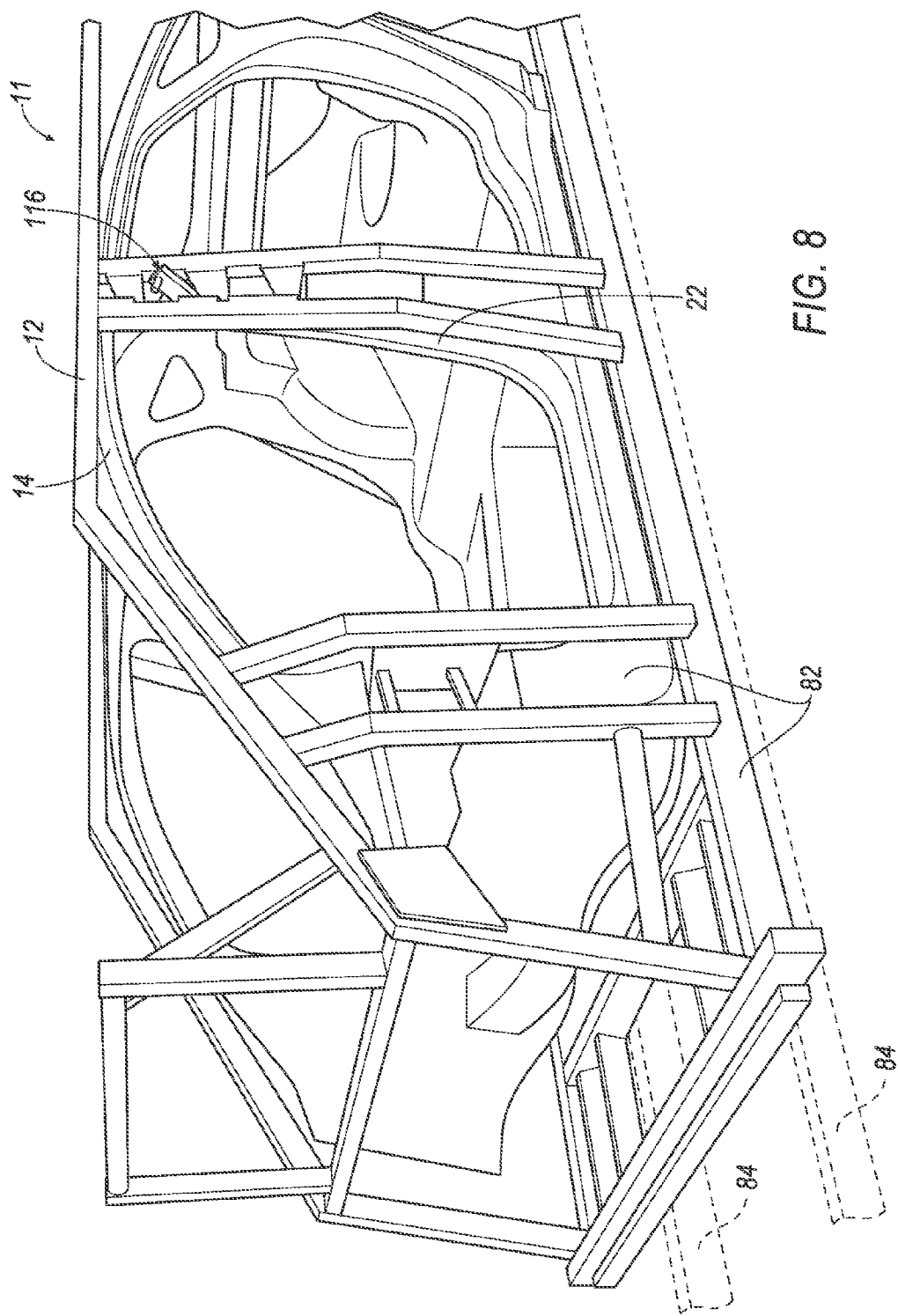
FIG. 8 is a perspective view of a sled buck including a vehicle and a cage for simulating a vehicle frontal impact.

With reference to the Figures, wherein like numerals indicate like parts throughout the several views, a testing device 10, 11 is shown. A first embodiment of the testing device 10 is shown in FIGS. 1-4, and may be used to simulate a vehicle rollover, as described below. A second embodiment of the testing device 11 is shown in FIG. 8, and may be used to simulate a vehicle frontal impact. Common numerals are used in the figures and this detailed description identify common features of the testing device 10 and the testing device 11.

Figure 1:
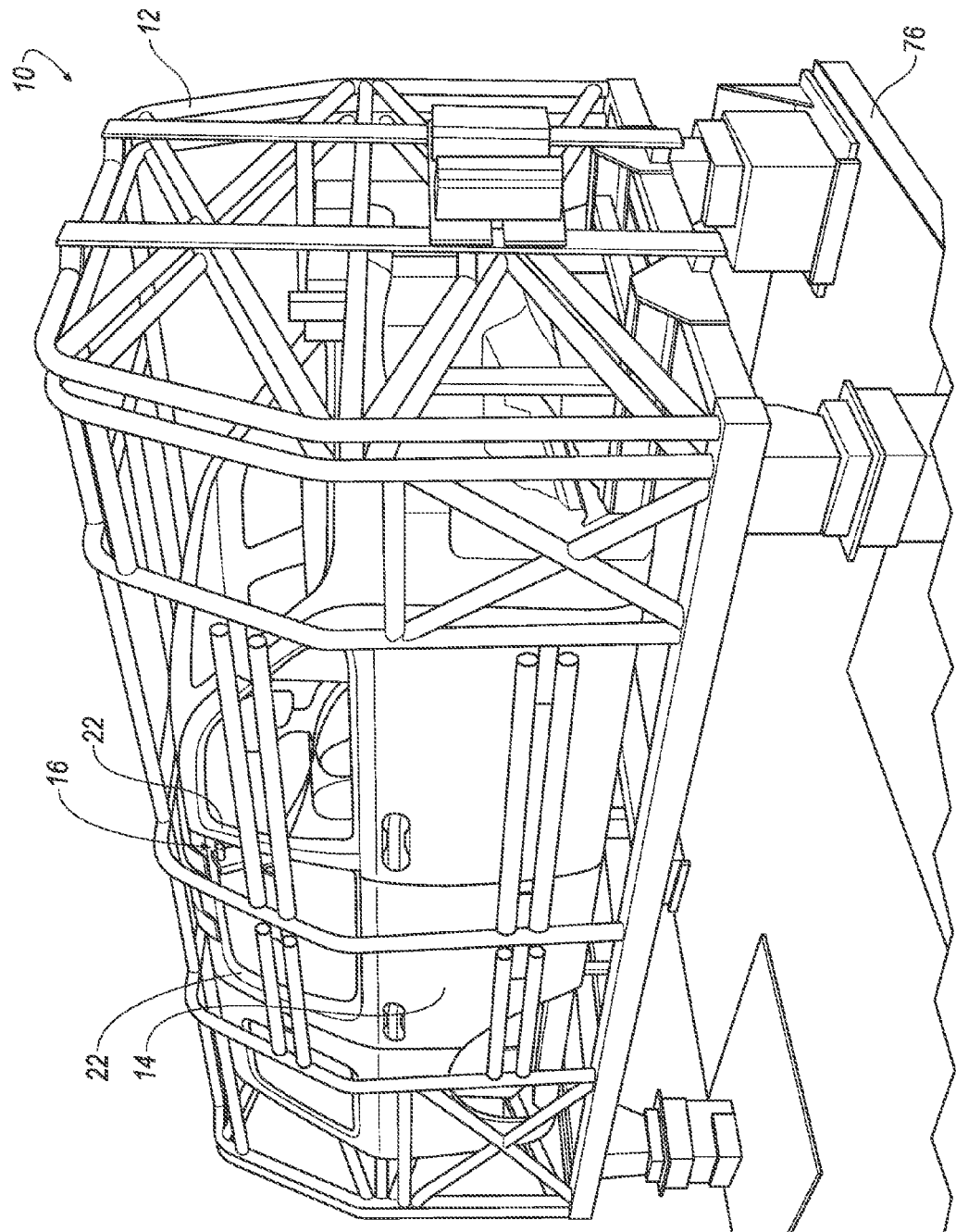
FIG. 1 is a perspective view of a cage and a vehicle for simulating vehicle rollover.
Figure 10:
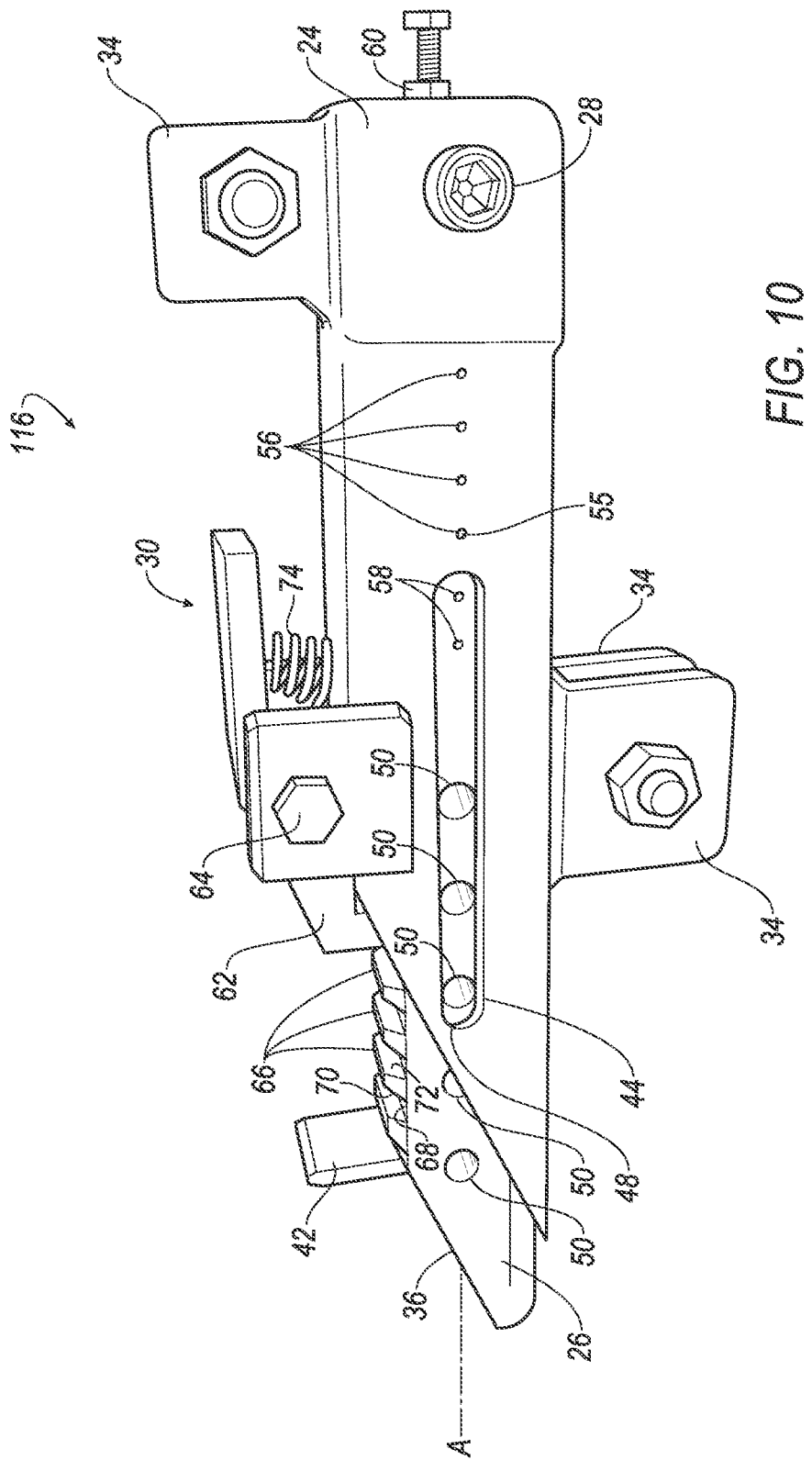
FIG. 10 is a side view of the second embodiment of the testing fixture with the piston fixed to a tube in a first example position.
Figure 11:
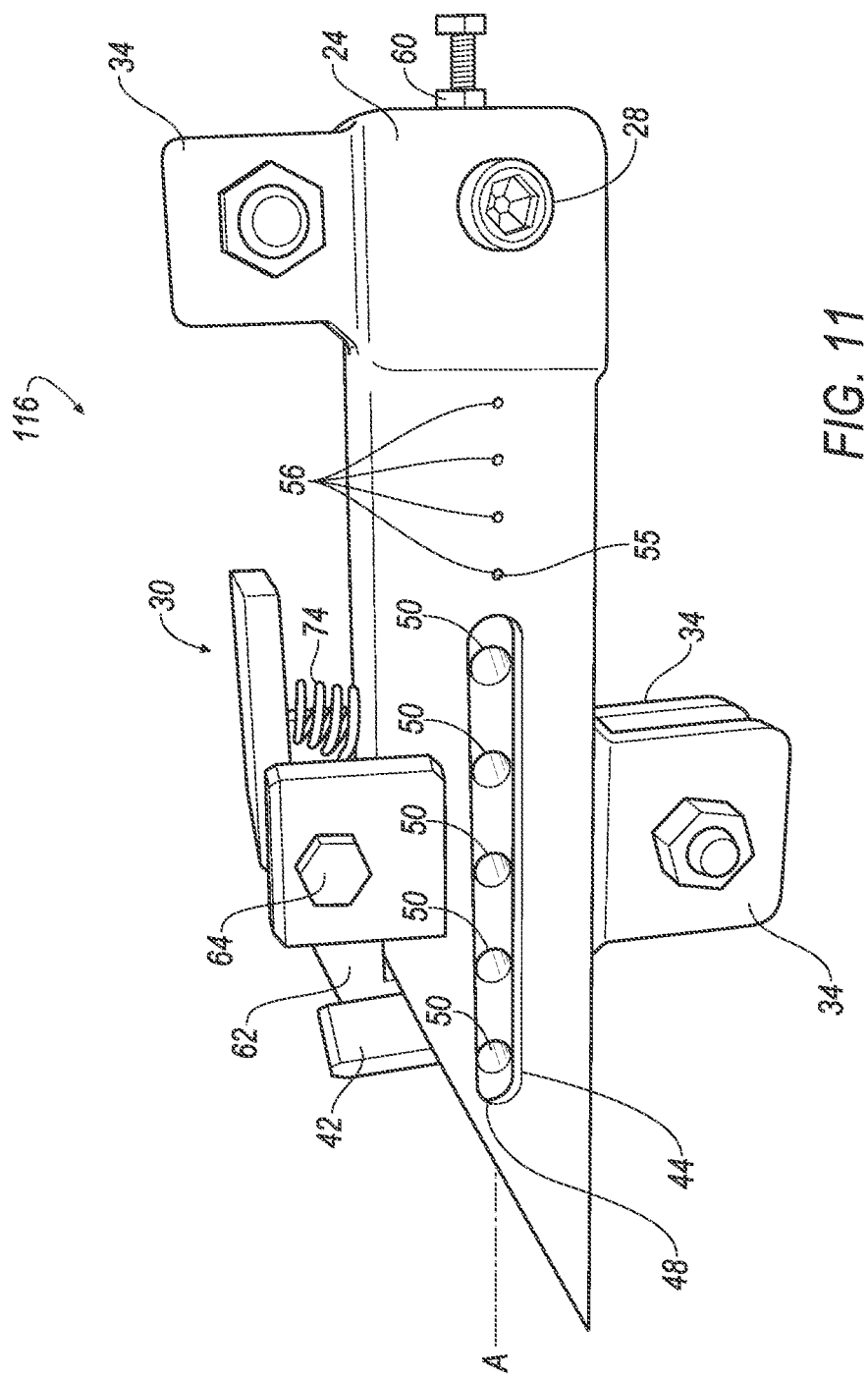
FIG. 11 is a side view of the second embodiment of the testing fixture with the piston fixed to the tube in a second example position.
Figure 12:
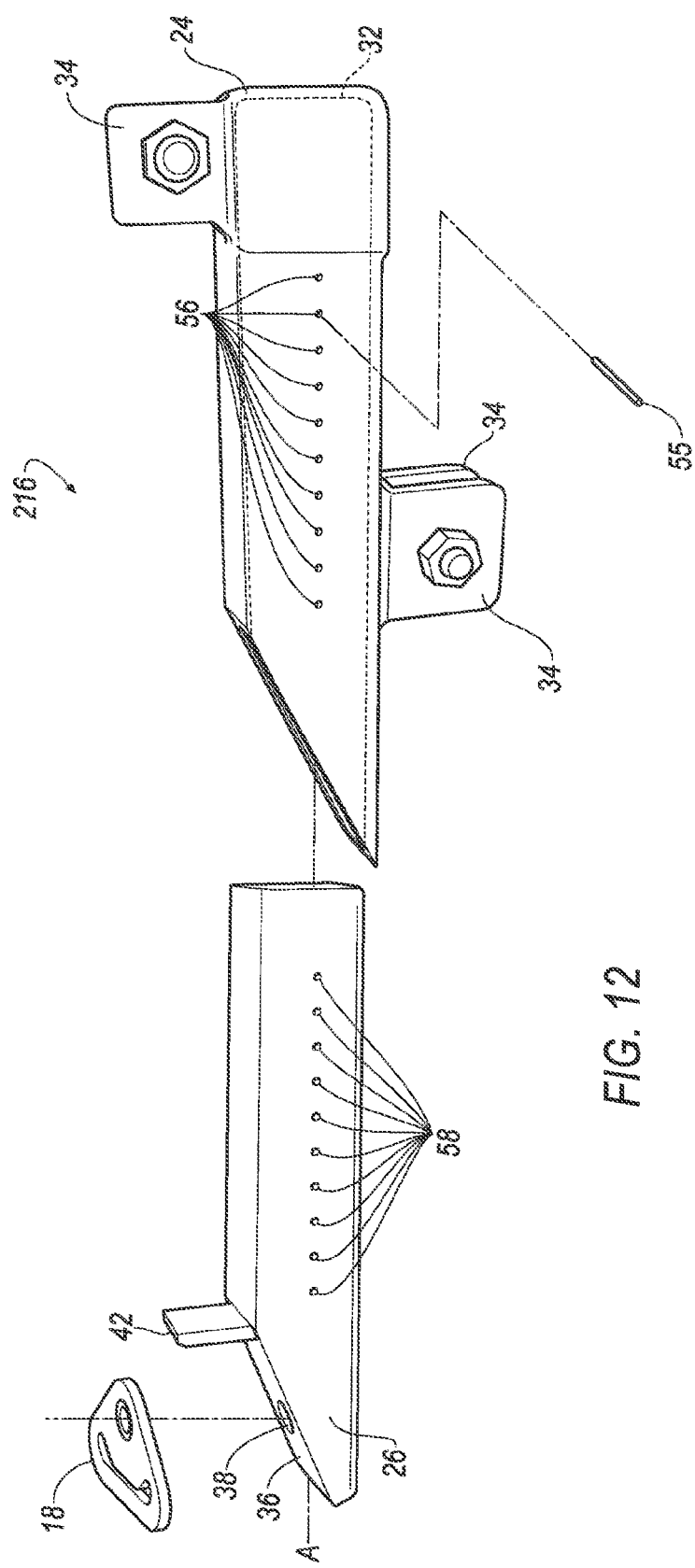
FIG. 12 is an exploded view of a third embodiment of the testing fixture.
Figure 13:
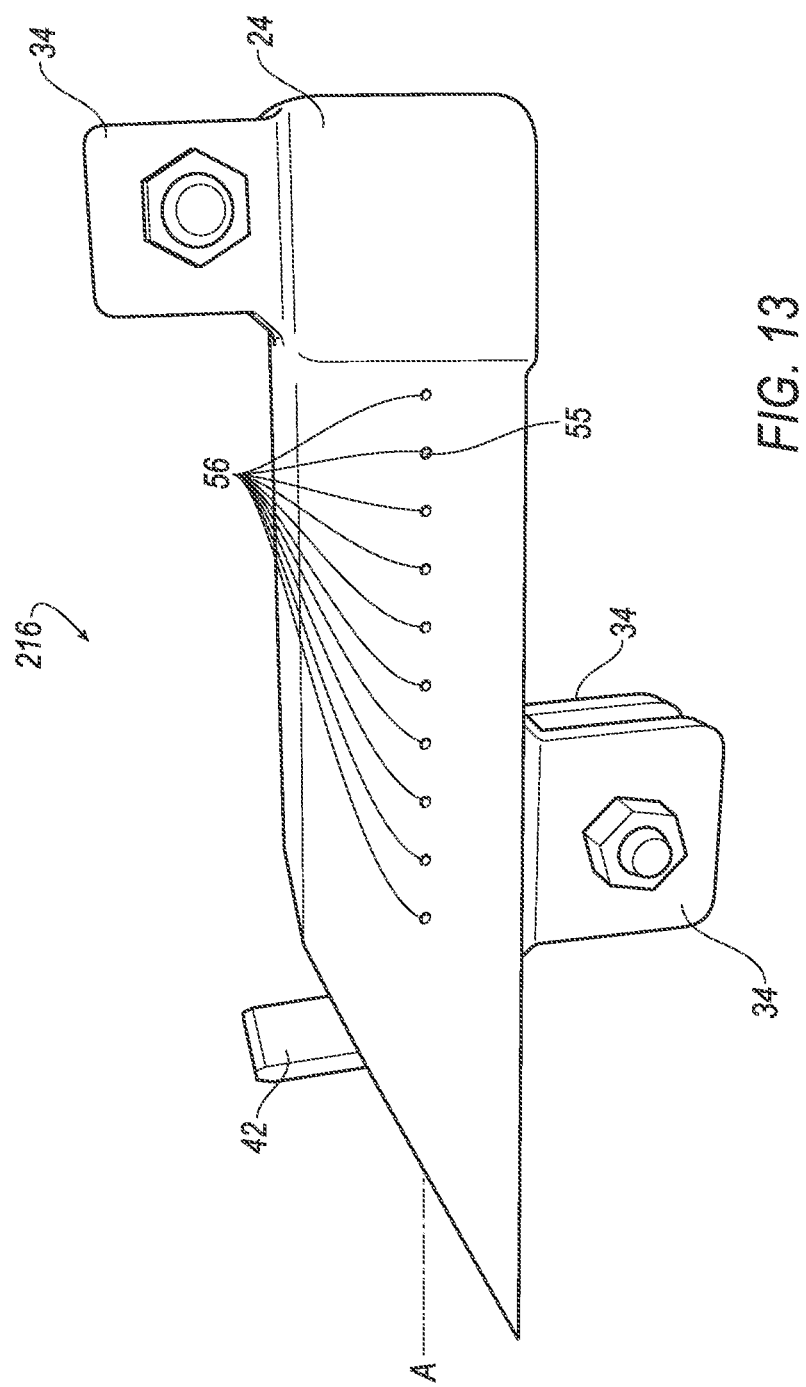
FIG. 13 is a side view of the third embodiment of the testing fixture with the piston fixed to the tube in a first example position.
Figure 14:
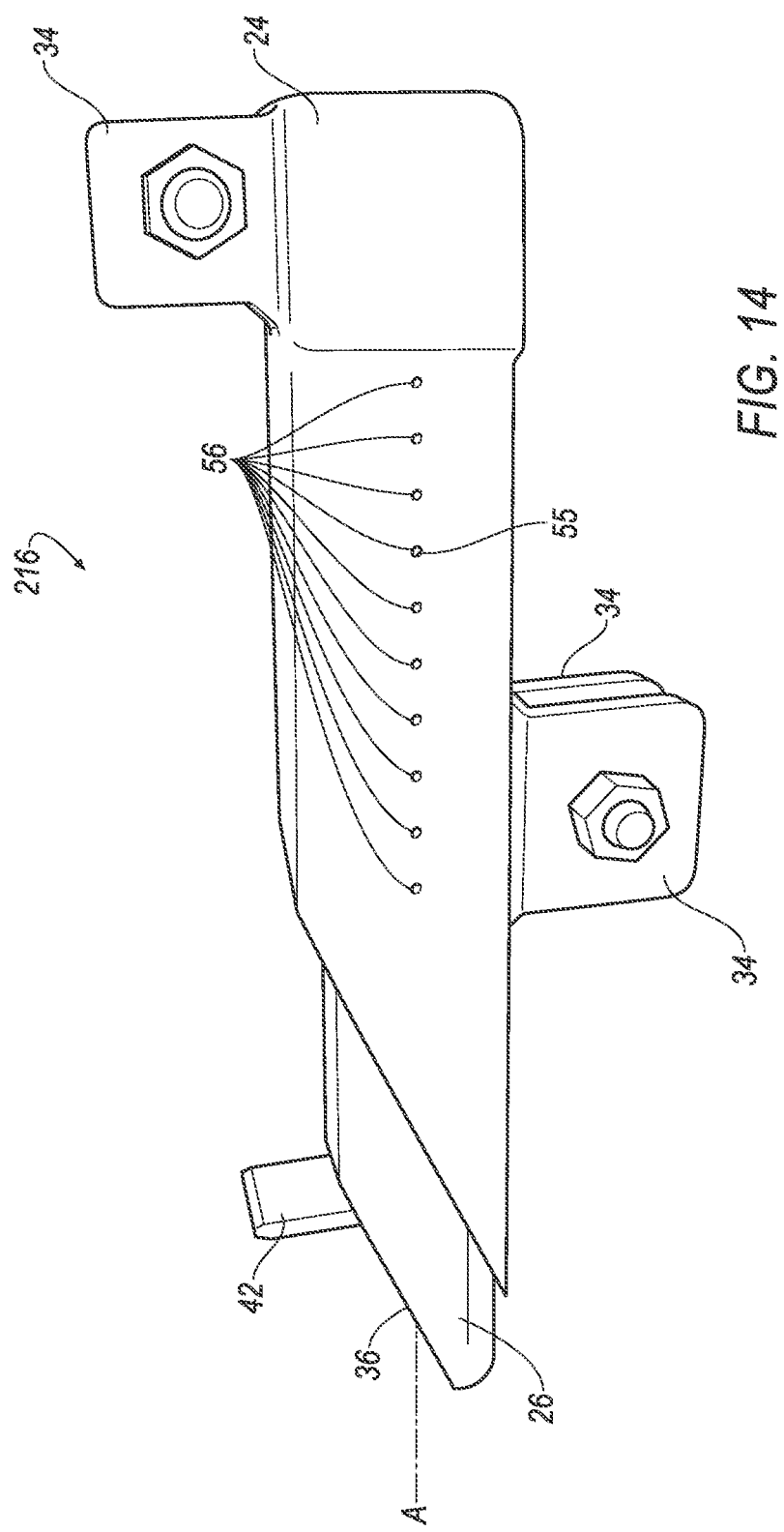
FIG. 14 is a side view of the third embodiment of the testing fixture with the piston fixed to the tube in a second example position.

With reference to FIGS. 1 and 8, the testing device 10, 11 includes a cage 12 for supporting a vehicle 14. With reference to FIGS. 1-4, the testing device 10 includes a testing fixture 16 for mounting to the vehicle 14. A second embodiment of the testing fixture 116 is shown in FIGS. 10-12, and a third embodiment of the testing fixture 216 is shown in FIGS. 12-14. As shown in FIG. 8, the testing device 11 may include the second embodiment of the testing fixture 116 may be mounted to the vehicle 14. Alternatively, the testing device 11 may include the first embodiment of the testing fixture 16 or the third embodiment of the testing fixture 216. In other words, any one of the testing fixtures 16, 116, 216 may be used in the testing device 11 to simulate a vehicle frontal impact. Common numerals are used in the figures and this detailed description to identify common features of the testing fixture 16, the testing fixture 116, and the testing fixture 216.

With reference to FIGS. 1-4, as set forth further below, the cage 12 may be rolled while the vehicle 14 is disposed in the cage 12 to simulate a vehicle rollover. The cage 12 simulates the vehicle rollover and prevents damage to the exterior of the vehicle 14 during the simulation. Since the exterior of the vehicle 14 is not damaged during the simulation of the vehicle rollover, the vehicle 14 may be re-used in repeated vehicle rollover simulations.

With reference to FIG. 8, as set forth further below, a sled buck 82 includes the cage 12 and the vehicle 14. The testing fixture 11 includes the sled buck 82 and a testing fixture 16, 116, 216. The sled buck 82 may be engaged with rails 84 mounted to the floor, and the sled buck 82 may be accelerated and decelerated, e.g., with motors, barriers, etc., to simulate a vehicle frontal impact. The use of the sled buck 82 allows the vehicle frontal impact to be simulated without damaging a vehicle, and the vehicle 14 may be re-used in repeated vehicle frontal impact simulations.

With reference to FIGS. 1-4, 8, and 12, the testing fixture 16, 116, 216 supports a D-ring 18 of a front seat belt 20 adjacent a pillar 22 of the vehicle. The testing fixture 16, 116, 216 moves the D-ring 18 during the simulation. For example, for a vehicle rollover simulation, the vehicle rollover in the cage 12 simulates deformation of the pillar 22 during a vehicle rollover, as set forth further below. As also set forth further below, the testing fixture 16, 116, 216 may be adjusted to simulate pillar deformation, seat belt height, etc., and/or associated movement of the D-ring 18 during a simulation.

Figure 5:
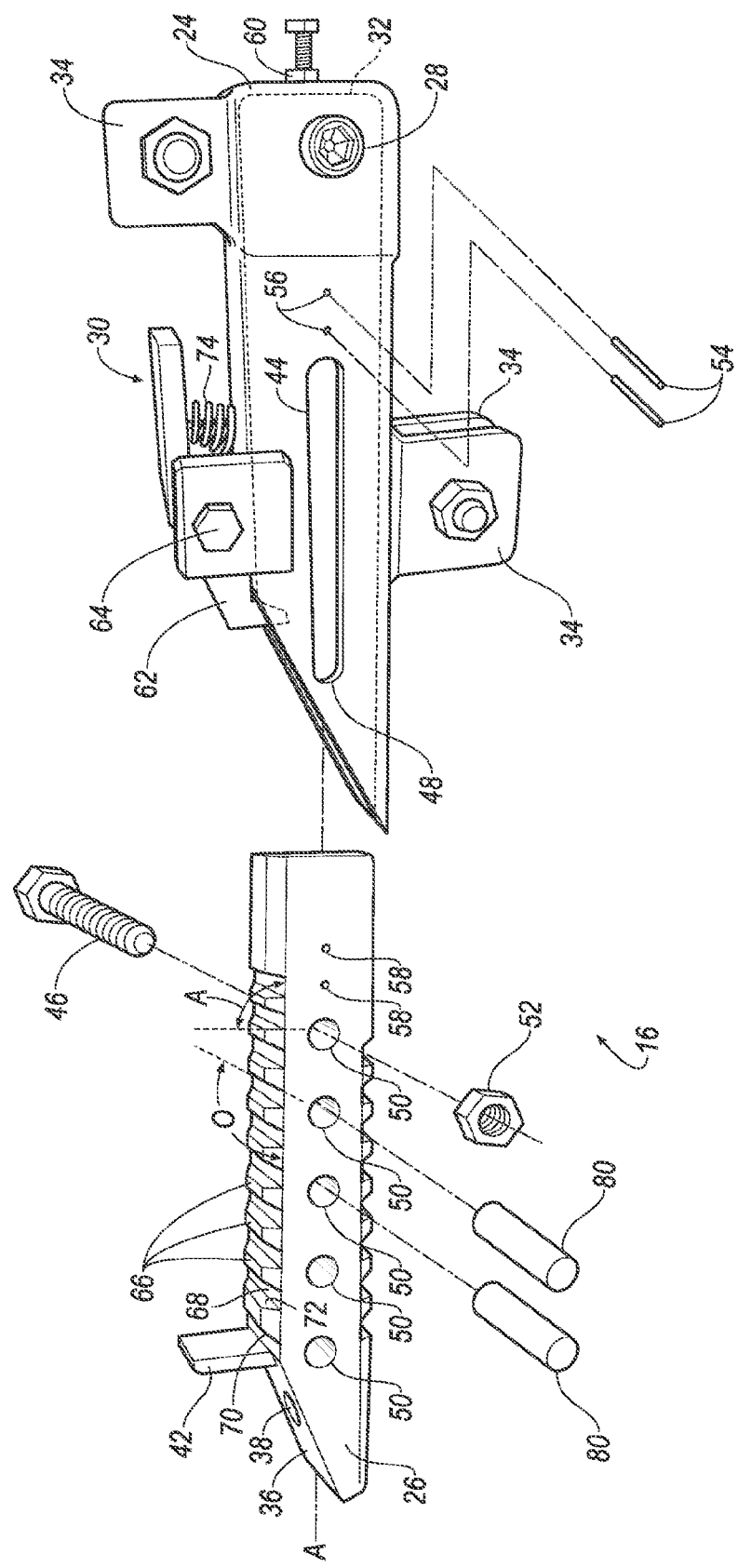
FIG. 5 is an exploded view of the testing fixture.
Figure 6:
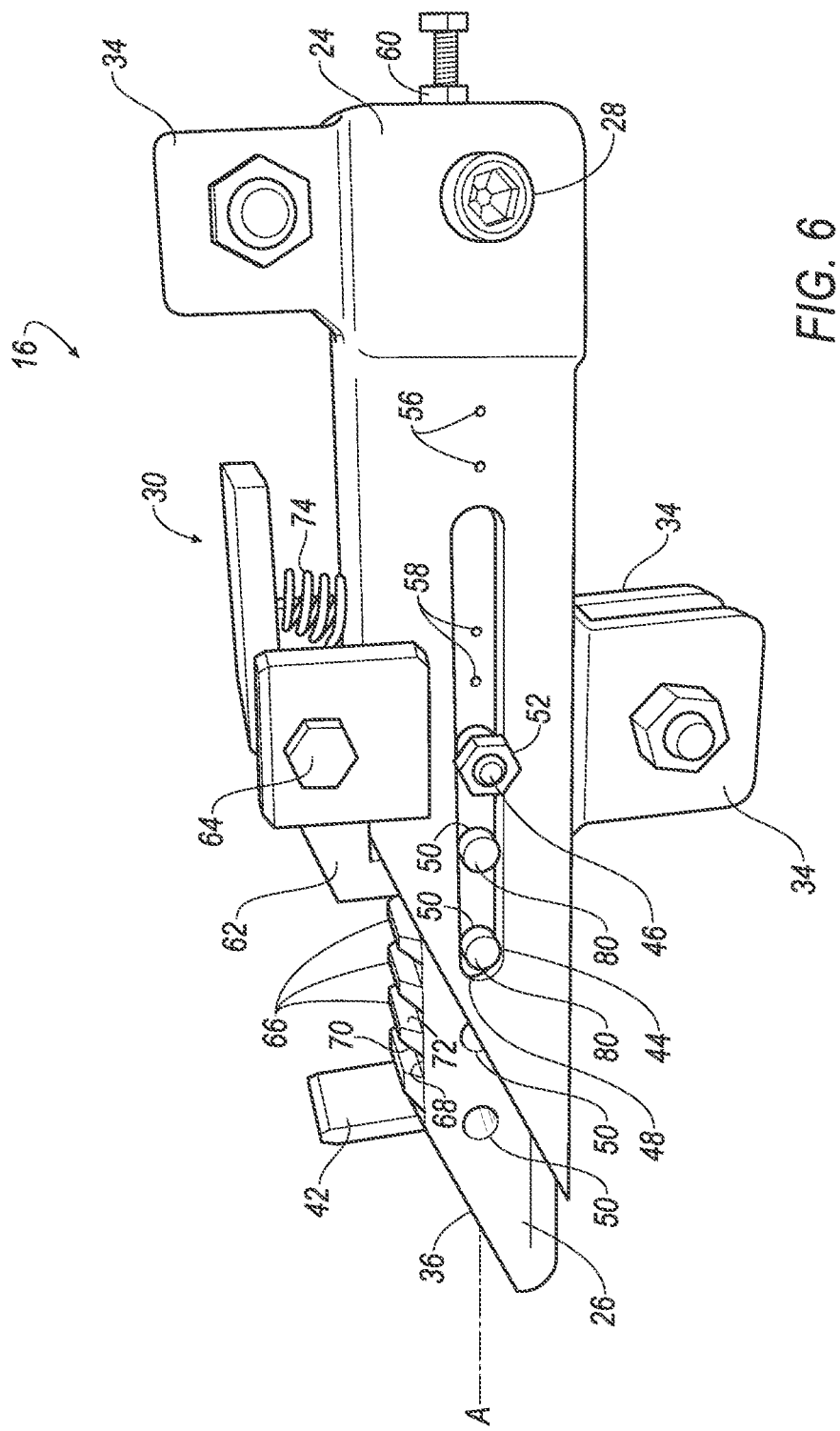
FIG. 6 is a side view of the testing fixture with a piston between a retracted position and an extended position.
Figure 7:
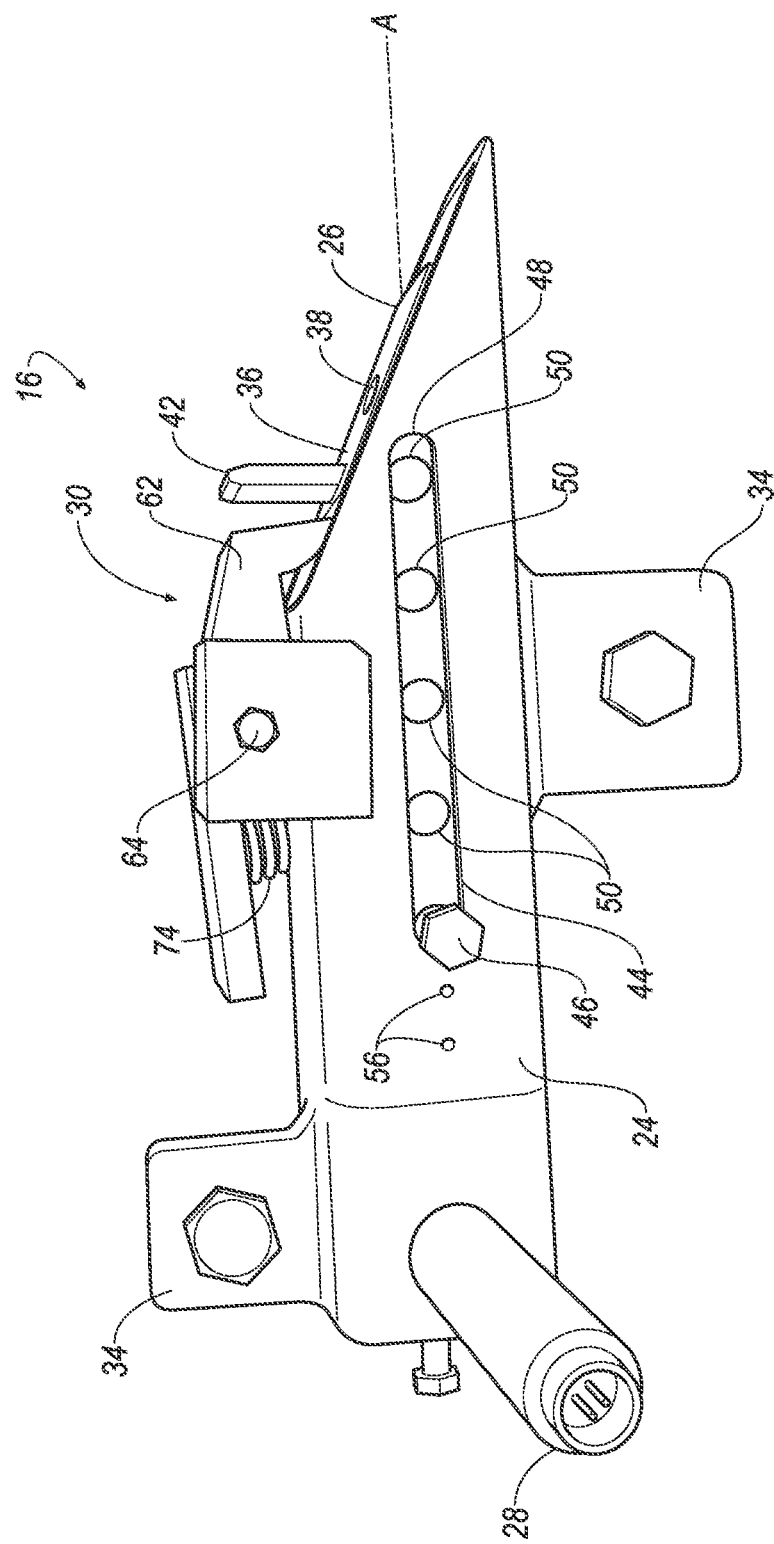
FIG. 7 is another side view of the testing fixture with the piston in the retracted position.

With reference to FIGS. 5-7, the testing fixture 16 includes a tube 24 and a piston 26 slideably disposed in the tube 24. An actuator 28 is supported on the tube 24 in communication with the piston 26 through the tube 24. A ratchet 30 is supported on the tube 24 and engaging the piston 26 for preventing movement of the piston 26 into the tube 24.

Figure 2:
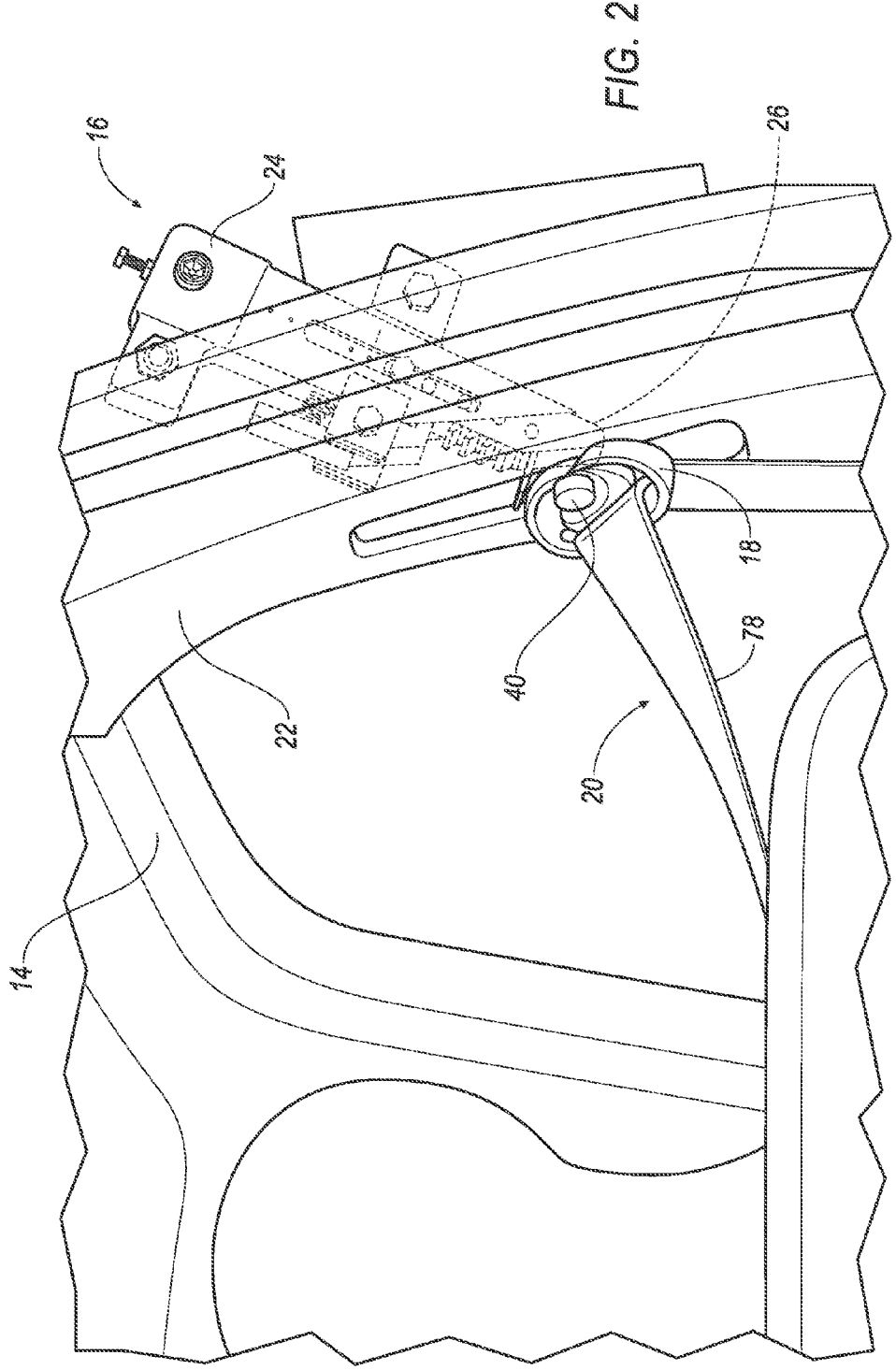
FIG. 2 is a perspective view of a portion of the vehicle in the cage with a testing fixture in a retracted position.
Figure 4:
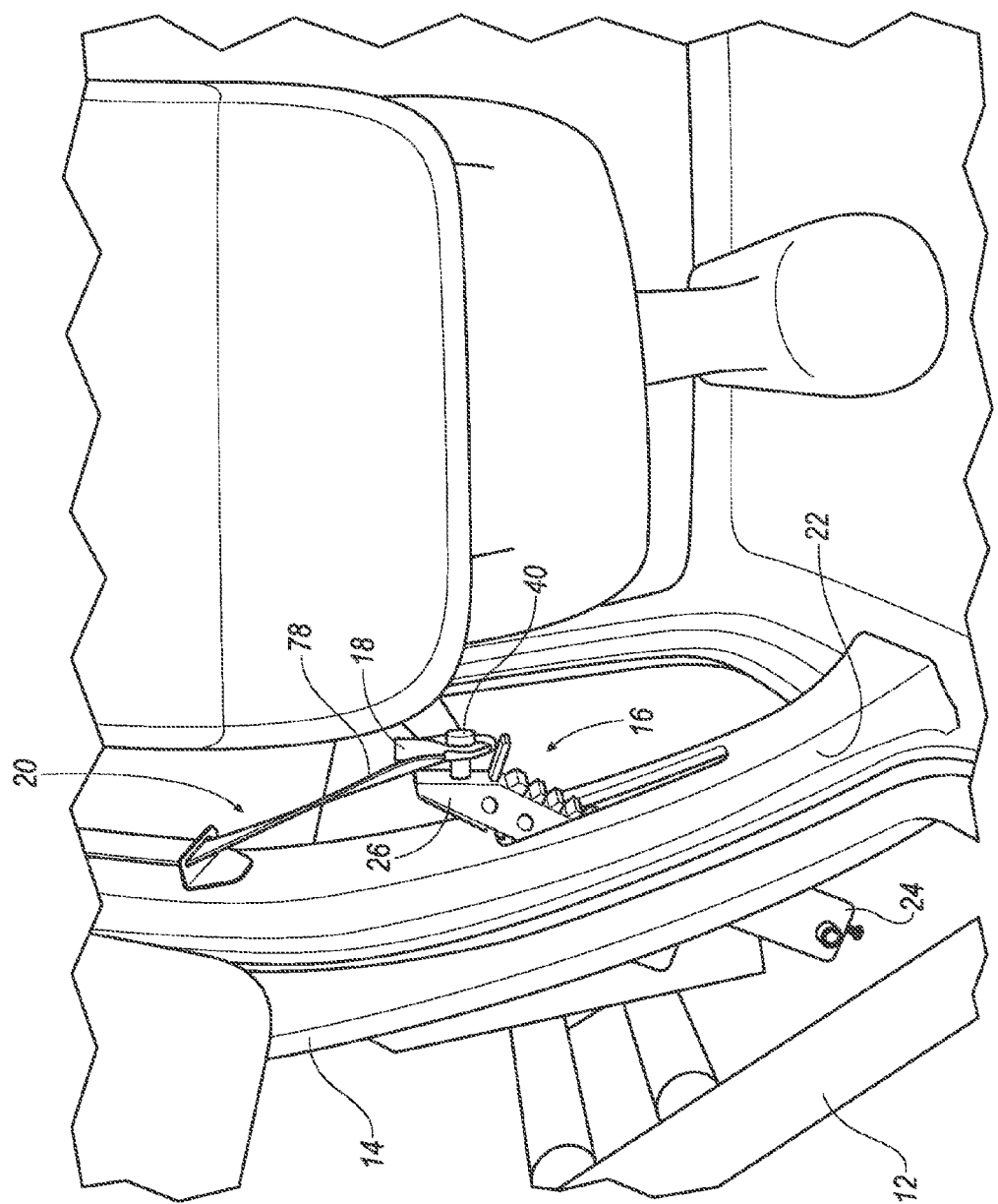
FIG. 4 is a perspective view of a portion of the vehicle in the cage during the vehicle rollover including the testing fixture in an extended position.

The piston 26 is initially in a retracted position relative to the tube 24, as best shown in FIGS. 2 and 7. During the vehicle rollover simulation, the actuator 28 is activated to extend the piston 26 from the tube 24 to an extended position, as shown in FIG. 4. The ratchet 30 is configured to allow movement of the piston 26 toward the extended position and to prevent movement of the piston 26 into the tube 24, i.e., toward the retracted position, to simulate the vehicle rollover. In other words, after the piston 26 moves to the extended position, the ratchet 30 retains the piston 26 in the extended position to simulate the permanent deformation of the pillar 22 during the vehicle rollover.

With reference to FIGS. 5-7, the tube 24 defines a chamber 32 receiving the piston 26. The chamber 32 may extend along an axis A and the piston 26 may extend from the retracted position to the extended position along the axis A.

The tube 24 may include one or more flanges 34 for fixing the tube 24 to the vehicle and/or the cage 12. For example, the flanges 34 are connected to the vehicle 14 with threaded nuts and bolts, as shown, for example, in FIG. 2. Alternatively, the flanges 34 may be connected to the vehicle and/or the cage 12 in any suitable fashion.

The tube 24 may be formed of metal, such as steel. Alternatively, the tube 24 may be formed of any suitable material.

The piston 26 may be configured to slide relative to the tube 24 in the chamber 32 from the retracted position to the extended position. The piston 26 and the chamber 32 may have a common cross-sectional shape to facilitate sliding of the piston 26 in the chamber 32. For example, the piston 26 and the chamber 32 have a rectangular cross-section in the Figures. Alternatively, the piston 26 and the chamber 32 may have any suitable cross-sectional shape to facilitate sliding of the piston 26 in the chamber 32.

As set forth above, the piston 26 supports the seat belt D-ring 18. Specifically, with reference to FIGS. 5-7, the piston 26 may include a mounting surface 36 and the piston 26 may be mounted to the mounting surface 36. The piston 26 may define a hole 38 in the mounting surface 36 for receiving a fastener 40 (shown in FIGS. 2 and 4) connected to the seat belt D-ring 18. The hole 38 and the fastener 40 may be threaded, for example.

The piston 26 may include a plate 42 disposed adjacent to the D-ring 18, as shown in FIGS. 2 and 4. The plate 42 may support an accelerometer (not shown) for measuring acceleration of the D-ring 18 as the D-ring 18 moves from the retracted position to the extended position.

The piston 26 may be formed of metal, such as steel. Alternatively, the piston 26 may be formed of any suitable material.

The tube 24 may define a slot 44 which may, for example, extend along the axis A. A stopping pin 46 may be engaged with the piston 26 and the slot 44 may receive the stopping pin 46. The stopping pin 46 moves along the axis A toward an end 48 of the slot 44 as the piston 26 moves from the retracted position toward the extended position. When the piston 26 reaches the extended position, the stopping pin 46 engages the end 48 of the slot 44 to stop the piston 26 in the extended position. As set forth above, and as described further below, the ratchet 30 engages the piston 26 when the piston 26 is in the extended position to prevent the piston 26 from moving along the axis A toward the retracted position.

With continued reference to FIGS. 5-7, the piston 26 defines a plurality of holes 50 along the slot 44 for alternatively receiving the stopping pin 46. One or more of the holes not receiving the stopping pin 46 may receive a shear pin 80, as shown in FIGS. 5-6. When the piston 26 is disposed in the chamber 32, the holes 50 are spaced from each other along the axis A. When the piston 26 is in the retracted position, the holes 50 may be exposed through the slot 44 so that the stopping pin 46 may be engaged with one of the holes 50. Any one of the holes 50 may be engaged with the stopping pin 46 to choose the length of the extension of the piston 26 from the tube 24 in the extended position.

The holes 50 may extend through the piston 26. In such a configuration, the stopping pin 46 may extend through one of the holes 50 and retained in the hole 50 by a fastener 52. For example, the stopping pin 46 may be threaded and may receive a threaded nut to fix the stopping pin 46 in the selected hole. The fastener 52 may, alternatively, be any suitable type of fastener, e.g., a cotter pin, a cap, etc.

One or more shear pins 80, shown in FIGS. 5-6, may be engaged with the holes 50. The shear pins 80 may be configured to be frangible when the actuator 28 is activated. Specifically, the shear pins 80 may be used to tune the movement of the piston 26 from the retracted position to the extended position. For example, the shear pins 80 may slow the movement of the piston 26 toward the extended position to a desired acceleration. The shear pins 80 may be formed of any suitable material type, material grade, and diameter. As examples, the shear pins 80 may be formed of aluminum, stainless steel, steel, etc. One or more shear pins 80 of the same or different material type, material grade, and/or diameter may be engaged with the holes 50 to tune the movement of the piston 26 when the actuator 28 is activated. Two shear pins 80 are shown in FIGS. 5-6, however, it should be appreciated that any number of shear pins 80 may be engaged with any number of respective holes 50.

One or more shear pins 54 may engage the tube 24 and the piston 26 to temporarily retain the piston 26 in the retracted position. Specifically, with reference to FIG. 5, the tube 24 may define one or more holes 56 and the piston 26 may define one or more holes 58 that align with each other when the piston 26 is in the retracted position. The shear pin 54 may be engaged with the holes 56, 58 to retain the piston 26 in the retracted position. FIG. 6 shows the piston 26 between the retracted position and the extended position.

The shear pin 54 is configured to be frangible when the actuator 28 is activated. As such, the shear pin 54 prevents movement of the piston 26 relative to the tube 24 prior to the rollover simulation and, during the rollover simulation, the actuator 28 breaks the shear pin 54 and forces the piston 26 toward the extended position. As set forth above, the stopping pin 46 stops the piston 26 in the extended position and the ratchet 30 retains the piston 26 in the extended position.

The number and location of shear pins 54 engaged with the tube 24 and the piston 26 may be selectively chosen based on the desired shear force required to break the shear pins 54. For example, in the configuration shown in the Figures, the piston 26 and the tube 24 each define a pair of corresponding holes 56, 58. In this configuration, one shear pin 54 may be engaged in either of the corresponding holes 56, 58, or two shear pins 54 may both corresponding holes 56, 58, depending on the desired shear forces. The shear force required to break the shear pins 54 may also be modified by modifying the thickness and material type of the shear pins 54.

The actuator 28 may be a gas inflator. In such a configuration, the gas inflator may be in communication with the chamber 32 and, upon activation, may introduce pressurized gas into the chamber 32 to force the piston 26 to the extended position. The piston 26 may be sealed to the tube 24 along the chamber 32 such that the chamber 32 is gas-tight. The actuator 28 may, alternatively, be of any suitable type including mechanical, hydraulic, pneumatic, etc.

With continued reference to FIGS. 5-7, the tube 24 may define a pressure port 60. In the configuration where the actuator 28 is the gas inflator, the pressure port 60 may be selectively opened or closed to control a desired amount of pressure in the chamber 32 from the gas inflator. The testing fixture 16 may include a pressure sensor (not shown) in the chamber 32 for measuring the pressure in the chamber 32 during activation of the actuator 28.

The actuator 28 may be fixed to the tube 24. For example, as shown in FIGS. 5-7, the actuator 28 may be bolted to the tube 24 with a bolt.

As set forth above, the ratchet 30 engages the piston 26 to allow movement of the piston 26 toward the extended position and to prevent movement of the piston 26 toward the retracted position. As such, when the actuator 28 is activated to move the piston 26 from the retracted position to the extended position, the ratchet 30 retains the piston 26 in the extended position to simulate a permanently deformed pillar of the vehicle.

The ratchet 30 may include a pawl 62 pivotally mounted to tube 24. The pawl 62 may be pivoted about a pin, for example. The ratchet 30 may alternatively be of any suitable configuration for allowing the piston 26 to move toward the extended position and preventing movement of the piston 26 toward the retracted position.

The piston 26 may define teeth 66 engaged by the pawl 62. The teeth 66 extend upwardly from a base 68 and include a forward surface 70 angled at an obtuse angle θ relative to the base 68 and a rearward face 72 angled at an acute angle A relative to the base 68. In other words, the teeth 66 have a saw-tooth pattern. The pawl 62 may be shaped to match the angles of the forward face 70 and the rearward face 72. As such, the obtuse angle θ between the forward face 70 and the base 68 allows the forward face 70 to slide along the pawl 62 when the actuator 28 urges the pawl 62 toward the extended position. The acute angle A between the rearward face 72 and the base 68 wedges the pawl 62 against the rearward face 72 of the piston 26 is urged toward the retracted position, thus preventing movement of the piston 26 toward the retracted position.

The ratchet 30 may include a spring 74 between the pawl 62 and the tube 24. The spring 74 urges the pawl 62 into engagement with the teeth 66. As the actuator 28 moves the piston 26 toward the extended position, the pawl 62 rotates about the pin 64 as the forward face slides along the pawl 62. During this movement, the spring 74 urges the pawl 62 into engagement with the teeth 66. When the piston 26 is in the extended position, the spring 74 urges the pawl 62 against the teeth 66 to maintain engagement of the pawl 62 with the rearward surface 72 in the event the piston 26 is urged toward the retracted position.

With reference to FIG. 1, during the simulation of the vehicle rollover, the cage 12 may be placed on a sled 76, which is moved along a track (not shown). Brakes are applied to abruptly stop the sled 76, at which time the cage 12 rolls off of the sled 76 and continues to roll to simulate a vehicle rollover. The cage 12 protects the exterior of the vehicle 14 during the vehicle rollover simulation. The vehicle 14 used in the test may, for example, be the vehicle body-in-white, i.e., the frame and body panels. Alternatively, the vehicle 14 used in the test may include more or less features than the vehicle body-in-white.

As set forth above, during the vehicle rollover simulation, the actuator 28 is activated to move the piston 26 relative to the tube 24 from the retracted position to the extended position to simulate deformation of the pillar 22 to which the seat belt D-ring 18 is attached. When the actuator 28 is activated, the actuator 28 breaks the shear pins 54 and forces the piston 26 toward the extended position. As the piston 26 moves toward the extended position, the ratchet 30 rides along the forward faces 70 of the teeth 66. When the piston 26 reaches the extended position, the stopping pin 46 engages the end 48 of the slot 44 to stop the piston 26 in the extended position. When the piston 26 reaches the extended position, the ratchet 30 engages the teeth 66, and specifically engages the rearward face of a tooth 66, to lock the piston 26 in the extended position to simulate deformation of the pillar 22 and the associated movement of the D-ring 18.

Figure 3:
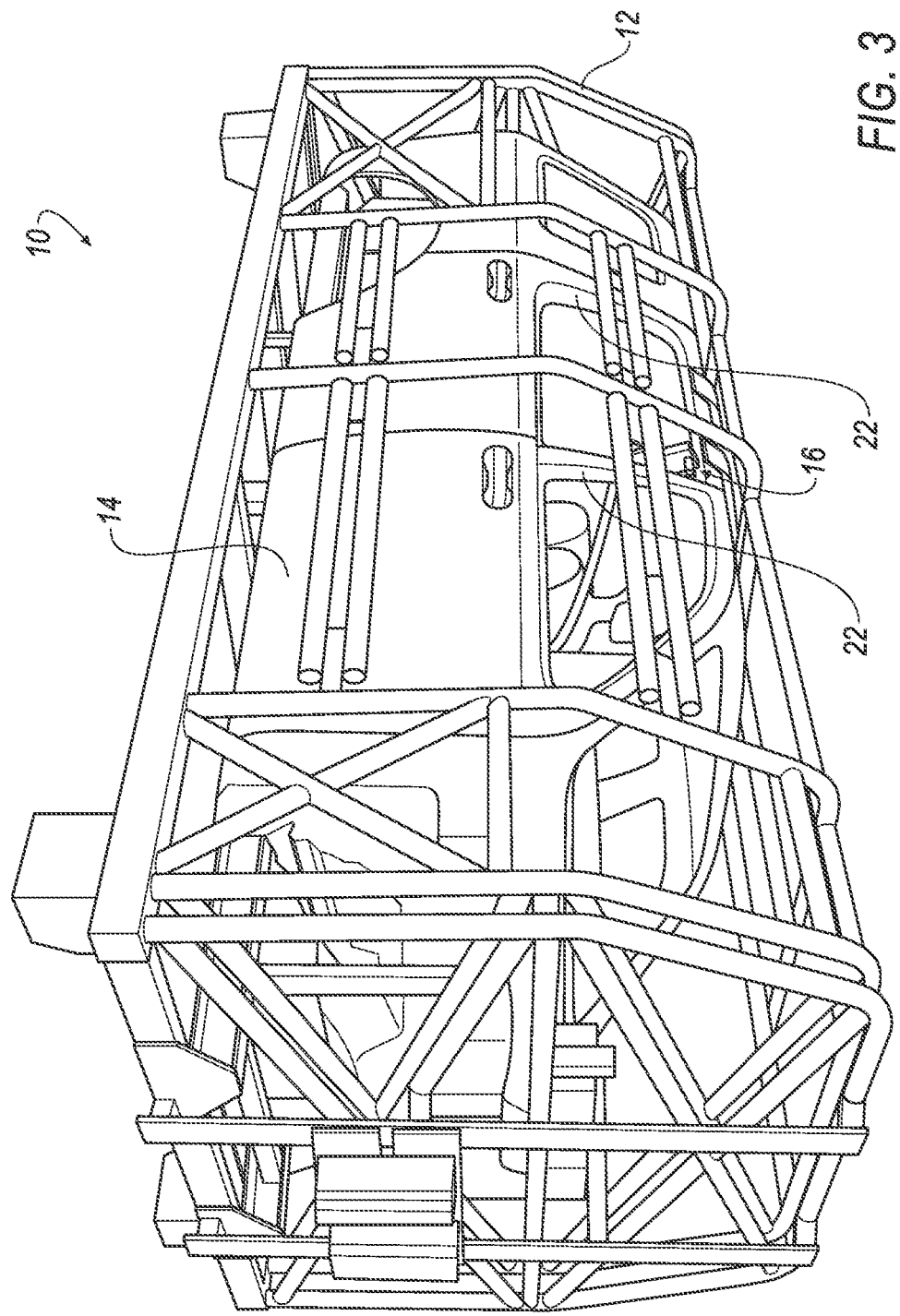
FIG. 3 is a perspective view of the cage and the vehicle during a simulated vehicle rollover.

In FIGS. 1 and 3, the testing fixture 16 is shown mounted to the B-pillar 22. Alternatively, the testing fixture 16 may be mounted to any suitable pillar 22 of the vehicle to simulate the deformation of that pillar 22 and the resulting movement of the D-ring 18 mounted to that pillar 22. The testing fixture 16 may be used for any suitable test including rollover tests such as rollover component tests, curb trip tests, laterally tripped full vehicle tests, etc.

With reference to FIGS. 2 and 4, the seat belt 20 includes the D-ring 18 and a belt 78, i.e., webbing 78, supported by the D-ring 18. The D-ring 18 supports the belt 78 such that the belt 78 extends across the shoulder of the occupant, as shown with the crash-test dummy in FIG. 1. It should be appreciated that the seat belt 20 may include a retractor (not shown) mounted to the seat or the body of the vehicle 14. A free end (not shown) of the belt 78 is also connected to the seat or the body of the vehicle 14. During the rollover simulation, the retractor and the free end of the seat belt 20 are connected to the seat and/or the body of the vehicle 14.

The testing fixture 16 may include an accelerometer (not shown) for measuring the acceleration, velocity, and displacement of the D-ring 18 during the test. The accelerometer may, for example, be attached to the plate 42 on the piston 26.

Figure 9:
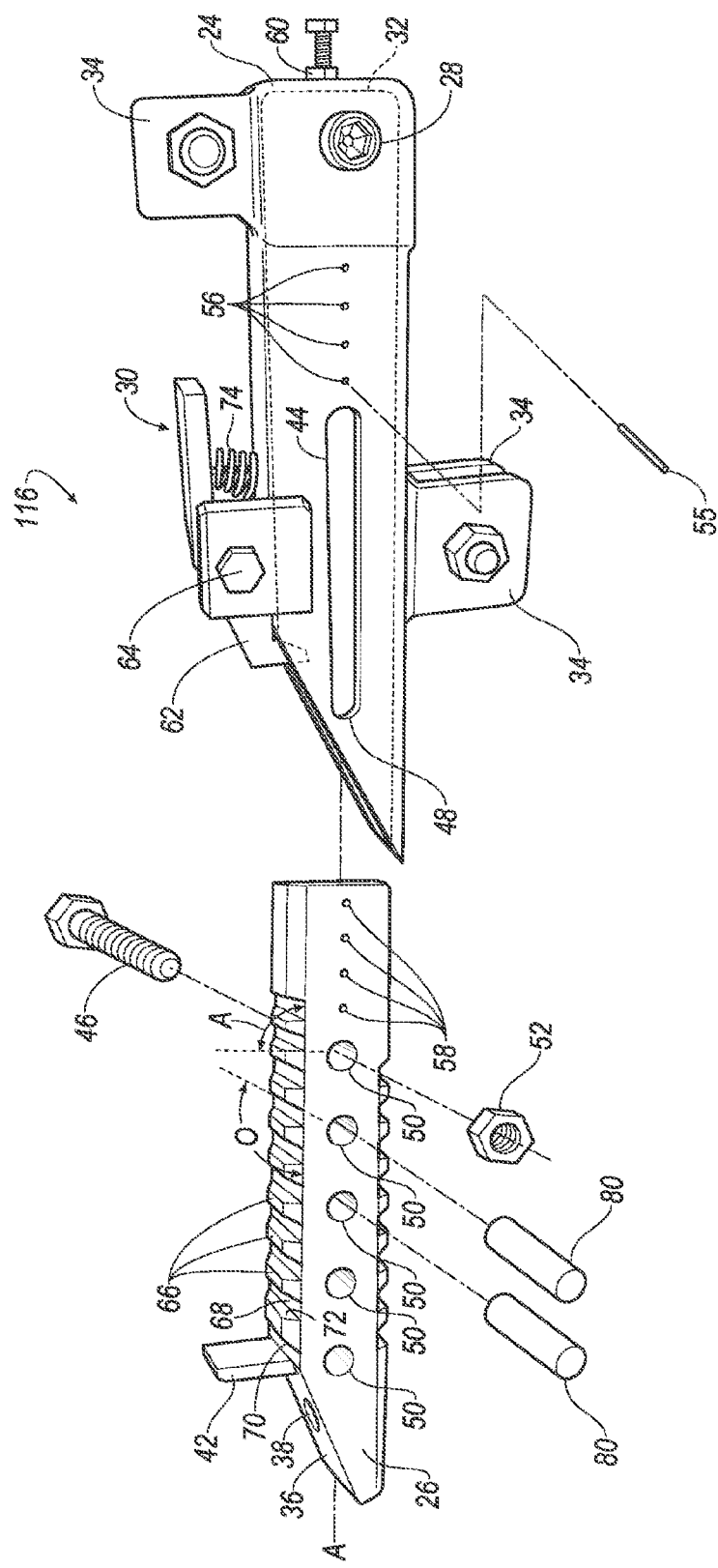
FIG. 9 is an exploded view of a second embodiment of the testing fixture.

With reference to FIGS. 9-11, the tube 24 may define several holes 56 and the piston 26 may define several holes 58 that align with each other as the piston 26 slides in the tube 24. Specifically, the tube 24 has an axis A, and the piston 26 is slideably disposed in the tube 24 along the axis A. The holes 58 in the piston 26 are spaced from each other along a line parallel to the axis A, and the holes 56 in the tube 24 are spaced from each other along a line parallel to the axis A.

The testing fixture 116 may be used with both the testing device 10 and the testing device 11, i.e., in a vehicle rollover simulation and a vehicle frontal impact. When used in the testing device 10, the testing fixture 116 may be operated as described for the testing fixture 16 above. When used with the testing device 10, i.e., in a vehicle rollover simulation, the testing fixture 116 is dynamic, i.e., the actuator 28 and ratchet 30 operate as described above.

When used in the testing device 11, the texting fixture 116 may be static. In other words, the actuator 28 is not operated during the vehicle frontal impact simulation.

With reference to FIGS. 9-11, the testing fixture 116 includes a pin 55 engageable with the holes 56, 58 when the holes 56, 58 are aligned. Specifically, as the piston 26 is slid along the axis A of the tube 24, at least some of the holes 56, 58 align with each other. The piston 26 may be slid relative to the tube 24 to align the holes 56, 58 with each other at a position along the axis A suitable for the simulation being performed. When this desired position is reached, the pin 55 is engaged with any one of the pair of aligned holes 56, 58 to fix the piston 26 relative to the tube 24. The pin 55 is removeable from the pair of aligned holes 56, 58. This allows the pin 55 to be removed and the piston 26 after the simulation to be adjusted relative to the tube 24 for future simulations.

The pin 55 is designed to maintain the piston 26 fixed to the tube 24 during a vehicle frontal impact simulation. In other words, the pin 55 is sized, shaped, and/or of a suitable material such that the pin 55 does not break during the vehicle frontal impact simulation. This ensures that the D-ring 18 is held at a fixed position relative to the pillar 22 to simulate a vehicle frontal impact. In addition to engaging the pin 55 with a pair of aligned holes 56, 58, another pin 55 may be engaged with another pair of aligned holes 56, 58 to strengthen the connection between the piston 26 and the tube 24 to ensure that the piston 26 and the tube 24 remain fixed to each other during the simulation.

With reference to FIGS. 12-14, the testing fixture 216 may be used with the testing device 11, i.e., in a vehicle frontal impact simulation. When used in the testing device 11, the texting fixture 116 may be static. The testing device 11 does not include the actuator 28 described above, and the piston 26 remains fixed relative to the tube 24 during the vehicle frontal impact simulation.

The tube 24 of the testing fixture 216 may define several holes 56 and the piston 26 may define several holes 58 that align with each other as the piston 26 slides in the tube 24. Specifically, the tube 24 has an axis A, and the piston 26 is slideably disposed in the tube 24 along the axis A. The holes 58 in the piston 26 are spaced from each other along a line parallel to the axis A, and the holes 56 in the tube 24 are spaced from each other along a line parallel to the axis A. The tube 24 of the testing fixture 216 may include a continuous wall, i.e., without the slot 44, in which the holes 56 are defined.

With continued reference to FIGS. 12-14, the testing fixture 216 includes a pin 55 engageable with the holes 56, 58 when the holes 56, 58 are aligned. Specifically, as the piston 26 is slid along the axis A of the tube 24, at least some of the holes 56, 58 align with each other. The piston 26 may be slid relative to the tube 24 to align the holes 56, 58 with each other at a position along the axis A suitable for the simulation being performed. When this desired position is reached, the pin 55 is engaged with any one of the pair of aligned holes 56, 58 to fix the piston 26 relative to the tube 24. The pin 55 is removeable from the pair of aligned holes 56, 58. This allows the pin 55 to be removed and the piston 26 after the simulation to be adjusted relative to the tube 24 for future simulations.

The pin 55 is designed to maintain the piston 26 fixed to the tube 24 during a vehicle frontal impact simulation. In other words, the pin 55 is sized, shaped, and/or of a suitable material such that the pin 55 does not break during the vehicle frontal impact simulation. This ensures that the D-ring 18 is held at a fixed position relative to the pillar 22 to simulate a vehicle frontal impact. In addition to engaging the pin 55 with a pair of aligned holes 56, 58, another pin 55 may be engaged with another pair of aligned holes 56, 58 to strengthen the connection between the piston 26 and the tube 24 to ensure that the piston 26 and the tube 24 remain fixed to each other during the simulation.

As shown in FIG. 12, the seat belt D-ring 18 is mounted to the piston 26. The seat belt 20 includes seat belt webbing 78 (shown, for example, in FIG. 2) connected to the body of the vehicle 14 and engaged with the D-ring 18. Specifically, the seat belt webbing 78 extends through a slot in the D-ring 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A fixture comprising:
a vehicle body;
a tube connected to the vehicle body and elongated along an axis transverse to the vehicle body, the tube having an open end;
a piston slideably disposed in the tube and slideable relative to the tube along the axis, the piston extending from the tube at the open end;
a seat belt D-ring mounted to the piston, the piston extending along the axis from the open end of the tube to the seat belt D-ring;
the tube and the piston each defining holes, the holes of the tube and the holes of the piston being positioned so that at least any one of the holes of the tube is aligned with at least any one of the holes of the tube when the piston is in multiple positions along the axis in the tube; and
a pin engageable with the holes when the holes are aligned.

2. The fixture as set forth in claim 1 further comprising seat belt webbing connected to the vehicle body and engaged with the D-ring.

3. The fixture as set forth in claim 1 further comprising teeth on the piston and a ratchet supported on the tube and engaging the teeth of the piston for preventing movement of the piston into the tube.

4. The fixture as set forth in claim 3 wherein the ratchet includes a pawl pivotally mounted to the tube.

5. The fixture as set forth in claim 4 further comprising a spring between the pawl and the tube.

6. The fixture as set forth in claim 1 further comprising an actuator supported on the tube in communication with the piston through the tube.

7. The fixture as set forth in claim 6 wherein the actuator is a gas inflator and wherein the tube defines a chamber receiving the piston, the chamber being in communication with the gas inflator.

8. The fixture as set forth in claim 1 wherein the tube defines a slot and the piston defines additional holes along the slot with a stopping pin engaged with one of the additional holes.

9. The fixture as set forth in claim 1 wherein the pin is designed to maintain the piston fixed to the tube during a vehicle frontal impact simulation.

10. The fixture as set forth in claim 1 wherein the holes in the piston are spaced from each other along a line parallel to the axis, and wherein the holes in the tube are spaced from each other along a line parallel to the axis.

* * * * *